(12) United States Patent
Dye et al.

(10) Patent No.: US 11,581,830 B2
(45) Date of Patent: Feb. 14, 2023

(54) DOOR CLOSER SYSTEM

(71) Applicant: Schlage Lock Company LLC, Carmel, IN (US)

(72) Inventors: William P. Dye, Indianapolis, IN (US); Ian K. Heckman, Noblesville, IN (US); Yong Kwan Lacy, Carmel, IN (US); Brendon M. Allen, Indianapolis, IN (US); Brian C. Eickhoff, Danville, IN (US); Ron M. Kielkowski, Noblesville, IN (US); Dale M. Collins, Colorado Springs, CO (US); David V. Toloday, Martinsville, IN (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

(21) Appl. No.: 16/358,201

(22) Filed: Mar. 19, 2019

(65) Prior Publication Data

US 2019/0319557 A1   Oct. 17, 2019

Related U.S. Application Data

(62) Division of application No. 13/889,769, filed on May 8, 2013, now Pat. No. 10,236,801.

(Continued)

(51) Int. Cl.
*H02P 3/14* (2006.01)
*E05F 15/614* (2015.01)
(Continued)

(52) U.S. Cl.
CPC ................ *H02P 3/14* (2013.01); *E05F 1/105* (2013.01); *E05F 3/22* (2013.01); *E05F 15/614* (2015.01);
(Continued)

(58) Field of Classification Search
CPC ........ H02P 3/14; E05F 15/614; E05F 15/619; E05F 3/22
See application file for complete search history.

(56) References Cited

U.S. PATENT DOCUMENTS 2,087,968 A   7/1937   Dodge
2,970,680 A   2/1961   Cain
(Continued)

FOREIGN PATENT DOCUMENTS

CA   2420748 C   *   6/2011   .............. E05F 15/42
CN   1076243 A       9/1993
(Continued)

OTHER PUBLICATIONS

Canadian Office Action, Canadian Intellectual Property Office, Canadian Patent Application No. 2,873,273, dated May 30, 2019, 4 pages.
(Continued)

*Primary Examiner* — Emily M Morgan
(74) *Attorney, Agent, or Firm* — Taft Stettinius & Hollister LLP

(57) ABSTRACT

A door closer system is provided that includes a motor, a spring, a reduction gear set, and a rack and a pinion mechanism. The spring and pinion may be coupled to the rack, and the pinion may be selectively coupled to the gear set. The motor may be selectively mechanically coupled to the gear set. The pinion may rotate in a first direction via the rack as the spring is compressed in a second direction opposite the first direction as the spring is expanded. The motor is operable to rotate and act upon the pinion through the gear set, thereby rotating the pinion in the second direction and assist the spring in closing the door.

20 Claims, 6 Drawing Sheets

Related U.S. Application Data

(60) Provisional application No. 61/644,385, filed on May 8, 2012.

(51) Int. Cl.
    *E05F 3/22*         (2006.01)
    *E05F 15/619*     (2015.01)
    *E05F 1/10*         (2006.01)

(52) U.S. Cl.
    CPC ....... *E05F 15/619* (2015.01); *E05Y 2201/412* (2013.01); *E05Y 2400/302* (2013.01); *E05Y 2400/612* (2013.01); *E05Y 2400/616* (2013.01); *E05Y 2900/132* (2013.01)

(56) References Cited

U.S. PATENT DOCUMENTS

| | | |
|---|---|---|
| 3,338,361 A | 8/1967 | Hoff |
| 3,367,465 A | 2/1968 | Newman |
| 3,415,562 A | 12/1968 | Petersen |
| 3,581,857 A | 6/1971 | Dallman |
| 3,797,331 A | 3/1974 | Kjeldsteen |
| 3,934,306 A | 1/1976 | Farris |
| 4,062,433 A | 12/1977 | St. John |
| 4,160,389 A | 7/1979 | Kubono |
| 4,226,320 A | 10/1980 | St. John |
| 4,289,995 A | 9/1981 | Sorber et al. |
| 4,296,852 A | 10/1981 | Luerken |
| 4,610,343 A | 9/1986 | Hikari |
| 4,690,257 A | 9/1987 | Suzuki et al. |
| 4,756,396 A | 7/1988 | Nagashima et al. |
| 4,960,194 A | 10/1990 | Sageshima et al. |
| 4,973,894 A | 11/1990 | Johansson |
| 5,010,994 A | 4/1991 | Heireth et al. |
| 5,018,304 A | 5/1991 | Longoria |
| 5,193,647 A | 3/1993 | O'Brien, II |
| 5,243,735 A * | 9/1993 | O'Brien, II ............ E05F 3/104 16/64 |
| 5,386,885 A | 2/1995 | Bunzl et al. |
| 5,438,799 A | 8/1995 | Le Faucheur |
| 5,513,467 A * | 5/1996 | Current ................ E05F 1/105 49/139 |
| 5,594,316 A | 1/1997 | Hayashida |
| 5,687,507 A | 11/1997 | Beran |
| 5,746,250 A | 5/1998 | Wick |
| 5,910,075 A | 6/1999 | Amel et al. |
| 6,633,094 B1 | 10/2003 | Andou |
| 7,522,042 B2 | 4/2009 | Milo |
| 7,571,515 B2 | 8/2009 | Fischbach et al. |
| 7,816,875 B2 | 10/2010 | Taheri et al. |
| 7,952,477 B2 | 5/2011 | Fogg |
| 8,169,169 B2 | 5/2012 | Hass et al. |
| 8,248,005 B2 | 8/2012 | Romer |
| 8,359,790 B2 | 1/2013 | Shin |
| 8,547,046 B2 | 10/2013 | Burris et al. |
| 8,564,235 B2 | 10/2013 | Burris et al. |
| 8,773,237 B2 | 7/2014 | Burris et al. |
| 10,236,801 B2 * | 3/2019 | Dye ................... E05F 1/105 |
| 2003/0213092 A1 | 11/2003 | Fischbach et al. |
| 2006/0244271 A1 | 11/2006 | Hass |
| 2009/0265992 A1 * | 10/2009 | Hass ................ E05F 15/63 49/340 |
| 2011/0252598 A1 * | 10/2011 | Burris ................ E05F 3/227 16/62 |
| 2011/0252845 A1 * | 10/2011 | Webb ................... E05B 13/108 70/101 |
| 2011/0257796 A1 | 10/2011 | Burris et al. |
| 2012/0029701 A1 | 2/2012 | Houser |
| 2012/0210647 A1 | 8/2012 | McKibben et al. |
| 2014/0346997 A1 | 11/2014 | Salutzki et al. |
| 2015/0262438 A1 * | 9/2015 | Zasowski .............. G06F 3/0482 340/5.51 |
| 2015/0298765 A1 | 10/2015 | Golden, Jr. |
| 2019/0319557 A1 * | 10/2019 | Dye ..................... E05F 15/614 |

FOREIGN PATENT DOCUMENTS

| | | |
|---|---|---|
| CN | 101802335 A | 8/2010 |
| DE | 102010019357 A1 | 11/2011 |
| EP | 0559947 A1 | 9/1993 |
| GB | 2479157 B | 10/2011 |
| JP | 2005124347 A | 5/2005 |

OTHER PUBLICATIONS

Chinese Search Report; State Intellectual Property Office, Peoples Republic of China; Chinese Patent Application No. 201810377747.7; dated Apr. 18, 2019; 5 pages.

Chinese Office Action; State Intellectual Property Office, Peoples Republic of China; Chinese Patent Application No. 201810377747.7; dated Apr. 29, 2019; 26 pages.

Chinese Decision of Rejection; State Intellectual Property Office, Peoples Republic of China; Chinese Patent Application No. 201810377747.7; dated Mar. 30, 2020; 11 pages.

Chinese Office Action; State Intellectual Property Office, Peoples Republic of China; Chinese Patent Application No. 201810377747.7; dated Nov. 19, 2019; 21 pages.

International Search Report and Written Opinion, dated Aug. 21, 2013, International Patent Application No. PCT/US2013/040116, ISA/US, 11 pages.

Chinese Search Report, Chinese Patent Office (State Intellectual Property Office of People's Republic China), Chinese Patent Application No. 201380036451.4, dated Oct. 23, 2015, 5 pages.

Chinese First Office Action, Chinese Patent Office (State Intellectual Property Office of People's Republic China), Chinese Patent Application No. 201380036451.4, dated Nov. 4, 2015, 22 pages.

Chinese Second Office Action, Chinese Patent Office (State Intellectual Property Office of People's Republic China), Chinese Patent Application No. 201380036451.4, dated May 26, 2016, 23 pages.

European Extended Search Report, European Patent Office, European Patent Application No. 13788368.2, dated Feb. 1, 2016, 9 pages.

Mexican First Office Action, Mexican Patent Office, Mexican Patent Application No. MX/a/2014/013663, dated Dec. 14, 2016, 4 pages.

Chinese Decision of Rejection, Chinese Patent Office (State Intellectual Property Office of People's Republic China), Chinese Patent Application No. 201380036451.4, dated Dec. 5, 2016, 24 pages.

Chinese Notification of Reexamination, Chinese Patent Office (State Intellectual Property Office of People's Republic China), Chinese Patent Application No. 201380036451.4, dated Sep. 5, 2017, 19 pages.

Mexican Office Action, Mexican Patent Office, Mexican Patent Application No. MX/a/2014/013663, dated Nov. 22, 2017, 9 pages.

Chinese Decision of Reexamination, Chinese Patent Office (State Intellectual Property Office of People's Republic China), Chinese Patent Application No. 201380036451.4, dated Jan. 25, 2018, 26 pages.

Canadian Office Action, Canadian Intellectual Property Office, Canadian Patent Application No. 3,080,761, dated Jun. 11, 2021, 4 pages.

Chinese Notification of Reexamination; National Intellectual Property Administration, Peoples Republic of China; Chinese Patent Application No. 201810377747.7; dated Aug. 30, 2021; 19 pages.

Canadian Office Action, Canadian Intellectual Property Office, Canadian Patent Application No. 3,080,761, dated Aug. 30, 2021, 3 pages.

* cited by examiner

DOOR CLOSER SYSTEM

CROSS REFERENCE TO RELATED APPLICATIONS

The present application is a divisional of U.S. patent application Ser. No. 13/889,769 filed May 8, 2013 and issued as U.S. Pat. No. 10,236,801, which claims the benefit of U.S. Provisional App. No. 61/644,385 filed May 8, 2012, the entire contents of each application hereby incorporated herein by reference.

TECHNICAL FIELD

The present disclosure generally relates to door closer systems and more particularly, but not exclusively, to self-powered door closer systems.

BACKGROUND

Alleviating difficulties found in operating door closers remains an area of interest. Present door closers suffer from a variety of limitations and disadvantages relative to certain applications. Door closers are utilized in many applications where a door must be shut after opening. This allows the user to pass through the doorway without manually closing the door. Door closers may utilize a spring assembly to close the door and a damper to ensure that the door does not slam closed. In order for the spring to properly shut the door, the door closer may be configured such that the spring is compressed upon opening the door and allowed to expand in order to close the door.

Government regulations may require that the door be capable of opening with a limit on the force required for opening. As an example, the United States Americans with Disabilities Act requires a door be capable of opening with a limit of 5 pounds force at 34 inches from the door hinge line. Utilizing a spring that allows a door to open within these limits may not be strong enough to close the door. Such conditions that would prevent the door from closing with a weak spring may include, for example, a pressure differential across the doorway, a heavy door, high friction within the door system, or a combination thereof. In order to stay within the above-described limits, some door closers have incorporated a motor to assist in opening and closing the door that requires a source of external power. While there have been various attempts at improving door closing technology, there is a need for further contributions to this technology.

SUMMARY

One embodiment of the present disclosure is a unique door closer with a motor that is self-powered for closing doors. Other embodiments include apparatuses, systems, devices, hardware, methods, and combinations for the same. Further embodiments, forms, features, aspects, benefits, and advantages of the present application shall become apparent from the description and figures provided herewith.

DETAILED DESCRIPTION

Figure 1:
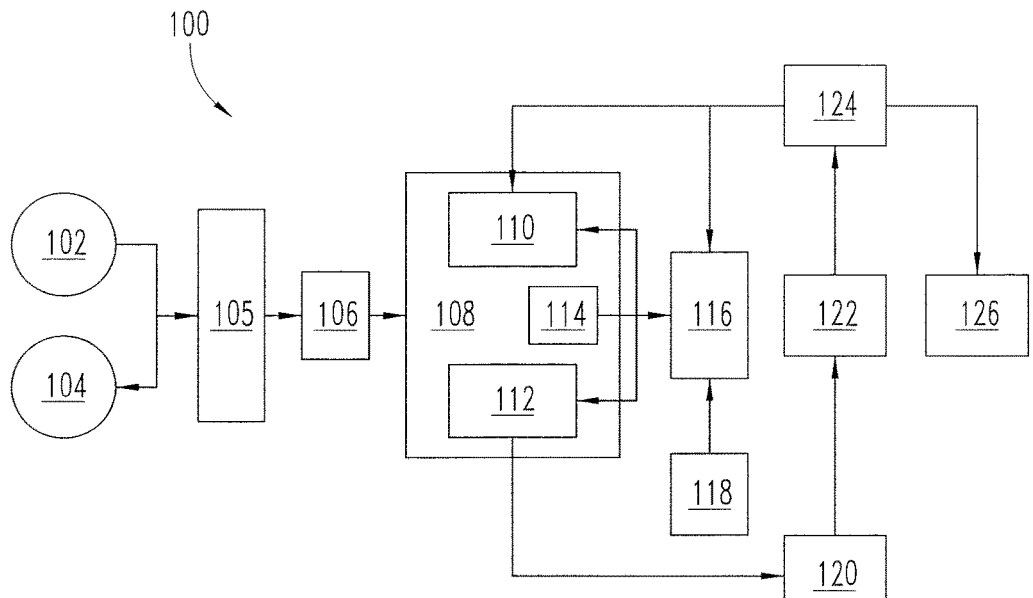
FIG. 1 is a schematic illustration of an embodiment of a door closing system.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, an example of a door and door closer system 100 is provided in schematic form. The system 100 is provided to assist in closing a door 105 located in a doorway. As used herein, a closed door is a door that is latched or substantially flush with the door frame. An open door is any door that is not closed. The system 100 is provided with inputs of a spring force 102, which can be provided from a spring of the door closing system and a user applied force 104. The user force 104 is applied to a door (not shown) while opening the door, during which process the spring supplying spring force 102 is compressed. As discussed herein, the spring of the door closer system 100 may be an assembly of one or more springs, and may be any combination of linear or rotational springs. The spring force 102 is generated by the compressed spring as it expands upon closing of the door. The spring and user forces 102, 104 flow through a mechanical interface 106 to a motor 108. The mechanical interface 106 may be, for example, an arm attached to a reduction gear set, which may include, for example, a rack and pinion, a spur gear set, a planetary gear set, or any combination thereof.

An electric motor 108 may be attached to the other end of the mechanical interface. The motor 108 may be of any known variety, such as a brushed or brushless DC permanent magnet motor. The motor 108 may impede the closing of a door, such as by providing a brake or dampening force during opening and/or closing of the door as indicated by braking and dampening module 112. Motor 108 may also provide an extra boost force to ensure the door closes completely as indicated in power boost module 110. During the process of opening the door by a user or during closing of the door under spring force 102, the motor 108 may also act as an electric generator and harvest energy. The motor 108 may also provide operational data 114 via feedback control sensors (not shown) to a control circuit 116, and control circuit 116 may receive inputs in response to changes in programming and other information through a user interface 118 or other controller.

The system 100 is also provided with energy harvesting components 120 for power conditioning by harvesting the power generated by the motor 108 and storing the harvested power with a power storage device 122, which may be, for example, a chargeable battery or a capacitor. The energy stored in the storage device 122 may then be passed through power supply components 124, which can supply power to the motor 108 to provide a closing boost force, supply power to the control circuit 116, or supply power to other features 126 that may require power, such as communications modules, readers, door locks, and controllers, for example.

With reference now to FIG. 2, the example system 100 includes a spring 134, a gear set 128, and a rack 132 and pinion 130 forming at least a part of mechanical interface 106. System 100 utilizes energy stored in spring 134 during opening of the door to drive gear set 128, including rack 132 and pinion 130, and apply torque Ta to motor 108 in order to create current I through control circuit 116. The impedance L of control circuit 116 acts as a damping system on the motor 108. The control circuit 116 also stores electrical energy via a capacitor C or to a battery to be used in the final few degrees of the door closing. The control circuit 116 controls the power release to the motor 108 to provide a boost in the door closing force during the final closing of the door. The system 100 is intended to be operable independently of outside power resources and fully operational for every operation cycle of the door.

In operation, the door is first opened by a user. As described above, various laws and/or regulations may limit the force required to open a door. As an example, the door opening force may be limited to 5 pounds force at 34 inches from the door hinge line to open. For such an example, a spring or spring assembly may be selected or designed accordingly that allows the door to open at such low forces. However, such a spring design may not have sufficient force to close the door under all possible conditions. Furthermore, when an excess opening force is applied to the door, the excess force may be dampened and harvested for storage in storage device 122 subsequent use in operation of system 100 while providing dampening and/or back checking to protect the door and operator.

After opening, the user may release the door allowing the door closer system 100 to close the door. In operation, the door closes in two phases. In a first phase, the spring compression is the only reliably available energy input into the system 100. Therefore, the door initially closes under the force of the spring. As the door closes, mechanical interface 106, such as an arm, rack and pinion mechanism, gear set, and spring utilizes the releasing spring energy to turn the shaft of motor 108. The motor 108 in turn, acting as a generator, generates power that is stored in a power storage device 122. Once the door is substantially closed, the second phase of closing takes place whereby the power is discharged from power storage device 122 to power the motor 108 and provide a boost force to close the door completely. In addition to providing energy to generate the boost force, the stored power may also be used to power the control circuit 116. Therefore, system 100 uses energy harvested from normal door operation and has no external power requirements.

Figure 2A:
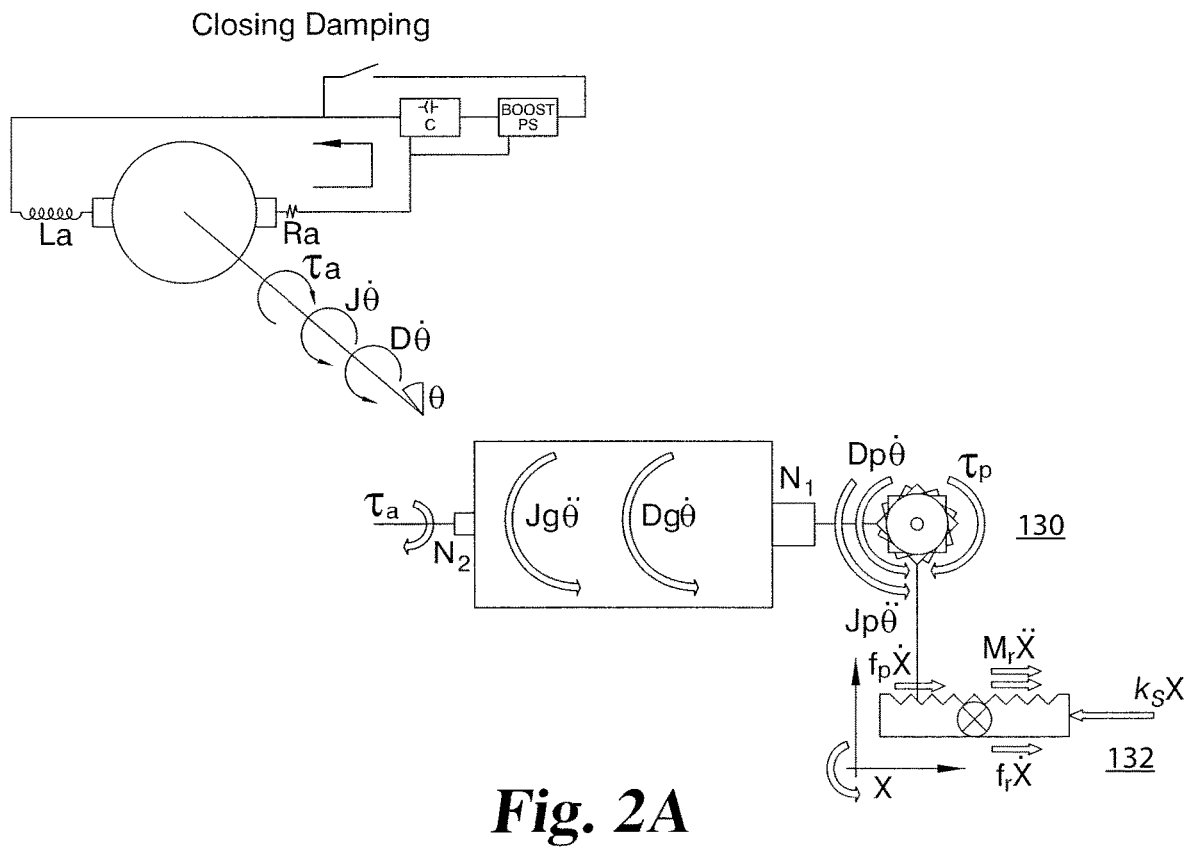
FIG. 2A is a functional system diagram of the electromechanical components of an embodiment of the present disclosure.
Figure 2B:
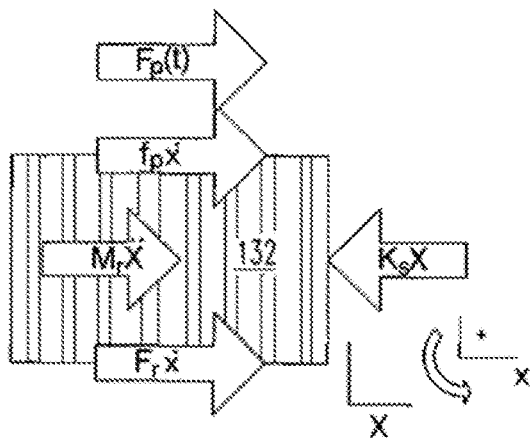
FIG. 2B is a functional system diagram of the rack during a closing phase of the door of an embodiment of the present disclosure.

FIGS. 2A-2F provide functional diagrams of the system 100 with numerous variables that may be factored in the considerations that determine the configuration of the system 100. From these diagrams and following equations, the spring force of the system 100 is used to determine the electrical requirements of the motor 108 in order for the motor 108 to provide sufficient boost force for closing of the door. While one specific example is provided below, other inputs and variables may be considered, or the inputs and variables discussed below may be considered in a different manner, depending on different system constraints. The nomenclature of FIGS. 2A-2F includes the following:

$X$ = Linear position/displacement $\dot{X} = \frac{d}{dt}x(t)$ = Linear velocity $\ddot{X} = \frac{d^2}{dt^2}x(t)$ = Linear acceleration $M_r$ = Mass of rack $k_S$ = Spring constant of spring $f_p$ = Friction acting on the rack due to the pinion $f_r$ = Friction acting on the rack due to the rack mounting $F_p(t)$ = Force of the pinion acting on the rack as a function of time $\Theta$ = Angular position/displacement $\dot{\Theta} = \frac{d}{dt}\Theta(t)$ = Angular velocity $\ddot{\Theta} = \frac{d^2}{dt^2}\Theta(t)$ = Angular acceleration $J_p$ = Angular mass moment of inertia of the pinion $D_p$ = Angular damping coefficient of the pinion $T_d$ = Torque of the door acting on the pinion $T_g$ = Torque of the gears acting on the pinion $r_p$ = Radius of the pinion $J_g$ = Angular mass moment of inertia of the gears in the direction toward the motor $D_g$ = Angular damping coefficient of the gears in the direction toward the motor $T_m$ = Torque of the motor acting on the gears $T_g$ = Torque of the gears acting on the pinion $N_1$ = Gear ratio, pinion side $N_2$ = Gear ratio, motor side $i_a$ = motor current due to armature $L_a$ = Motor armature inductance $C$ = Capacitance $R_a$ = Armature resistance $V_a(t)$ = Voltage across the armature Utilizing FIG. 2B as a system diagram:

$$F_p(t) + M_r \cdot \frac{d^2}{dt^2}x(t) + (f_p + f_r) \cdot \left(\frac{d}{dt}x(t)\right) - k_s \cdot x(t) = 0 \quad \text{(eq. 1)}$$

Taking the Laplace transform and solving for $F_p$:

$$F_p(s) = [-M_r \cdot s^2 - (f_p + f_r) \cdot s + k_s] \cdot x(s) \quad \text{(eq. 2)}$$

Figure 2C:
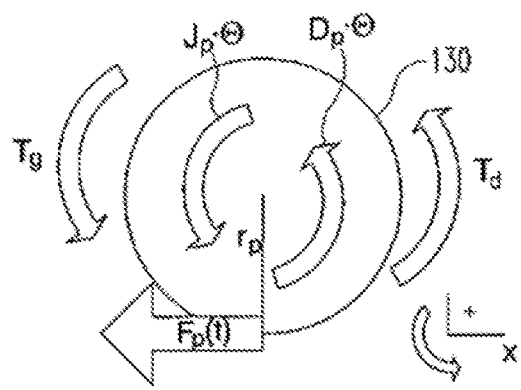
FIG. 2C is a functional system diagram of the pinion during a closing phase of the door of an embodiment of the present disclosure.

Using FIG. 2C as a system diagram:

$$T_g + T_d + J_p \cdot \frac{d^2}{dt^2}\Theta_p(t) + D_p \cdot \left(\frac{d}{dt}\Theta_p(t)\right) - r_p \cdot F_p(t) = 0 \quad \text{(eq. 3)}$$

Taking the Laplace transform and solving for $F_p$:

$$F_p(s) = \frac{T_g + T_d + (J_d \cdot s^2) \cdot D_p(s)}{r_p} \quad \text{(eq. 4)}$$

Figure 2D:
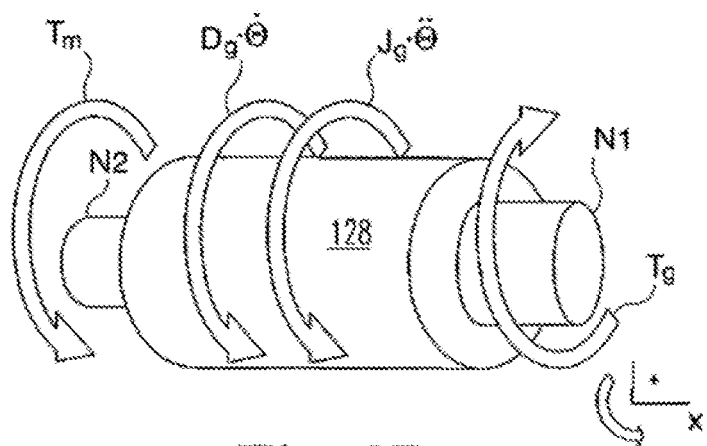
FIG. 2D is a functional system diagram of the gear set during a closing phase of the door of an embodiment of the present disclosure.

Using FIG. 2D as a system diagram:

$$-\frac{N_2}{N_1} \cdot T_g + J_g \cdot \frac{d^2}{dt^2}\Theta_g(t) + D_g \cdot \left(\frac{d}{dt}\Theta_g(t)\right) + T_m = 0 \quad \text{(eq. 5)}$$

Figure 2F:
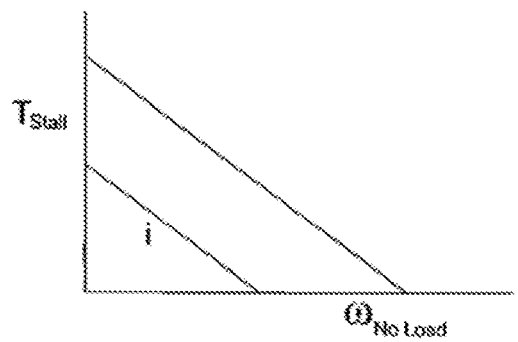
FIG. 2F is a graph of the motor current properties of an embodiment of the present disclosure.
Figure 2E:
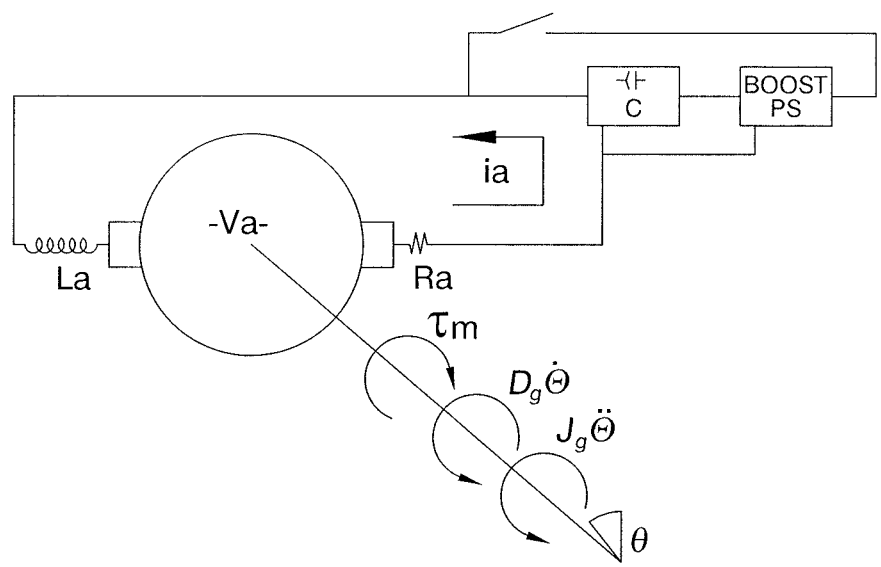
FIG. 2E is a functional system diagram of the motor and circuitry of an embodiment of the present disclosure.

Using FIG. 2E as a system diagram:

$$\left[V_a(t) - \frac{1}{C} \cdot \int_0^\infty i_a(t)dt - L_a\left(\frac{d}{dt}i_a(t)\right) - R_a \cdot i_a(t)\right] = 0 \quad \text{(eq. 6)}$$

Assuming that the armature of the motor is rigid and has no measurable angular spring effect, the moments acting on the armature of the motor are:

$$T_m(t) = J_m \cdot \frac{d^2}{dt^2}\Theta(t) - D_m\left(\frac{d}{dt}\Theta(t)\right) = 0 \quad \text{(eq. 7)}$$

Referring to FIG. 2F, the torque of the motor is proportional to the current of the motor:

$$T_m(t) = K_t \cdot i_a(t) \quad \text{(eq. 8)}$$

Motor back voltage is proportional to the armature angular velocity $$V_a(t) = K_b \cdot \left(\frac{d}{dt}\Theta(t)\right) \quad \text{(eq. 9)}$$

From FIG. 2F:

$$\frac{K_t}{R_a} = \frac{T_{stall}}{\omega_{no\ load}} \quad \text{(eq. 10)}$$

Using the relationship of torque to current from the motor properties:

$$i_a(t) = \frac{T_m(t)}{K_t} \quad \text{(eq. 11)}$$

Taking the Laplace transforms of eq. 6, and solving for $T_m$:

$$T_m(s) = (J_m \cdot s^2 + D_m \cdot s) \cdot \Theta(s) \quad \text{(eq. 12)}$$

Therefore:

$$\Theta(s) = \frac{T_m(s)}{(J_m \cdot s^2 + D_m \cdot s)} \quad \text{(eq. 13)}$$

Taking the Laplace transform of eq. 7 and solving for $V_a$:

$$V_a(s) = \left(\frac{1}{C \cdot s} + L_a \cdot s + R_a\right) \cdot i_a(s) \quad \text{(eq. 14)}$$

Taking the Laplace transforms of eqs. 8 and 9, respectively:

$$i_a(s) = \frac{T_m(s)}{K_t} \quad \text{(eq. 15)}$$

$$V_a(s) = K_b \cdot s \cdot \Theta(s) \quad \text{(eq. 16)}$$

By substitution of eq. 13 into eq. 16, and then into eq. 14

$$K_b \cdot s \cdot \frac{T_m(s)}{(J_m \cdot s^2 + D_m \cdot s)} = \left(\frac{1}{C \cdot s} + L_a \cdot s + R_a\right) \cdot i_a(s) \quad \text{(eq. 17)}$$

$$\frac{i_a(s)}{T_m(s)} = \frac{K_b \cdot s}{(J_m \cdot s^2 + D_m \cdot s) \cdot \left(\frac{1}{C \cdot s} + L_a \cdot s + R_a\right)} \quad \text{(eq. 18)}$$

Eq. 18 is the transfer function of the motor. Thus given the torque acting upon the motor, the current of the motor circuit can be determined.

Figure 3:
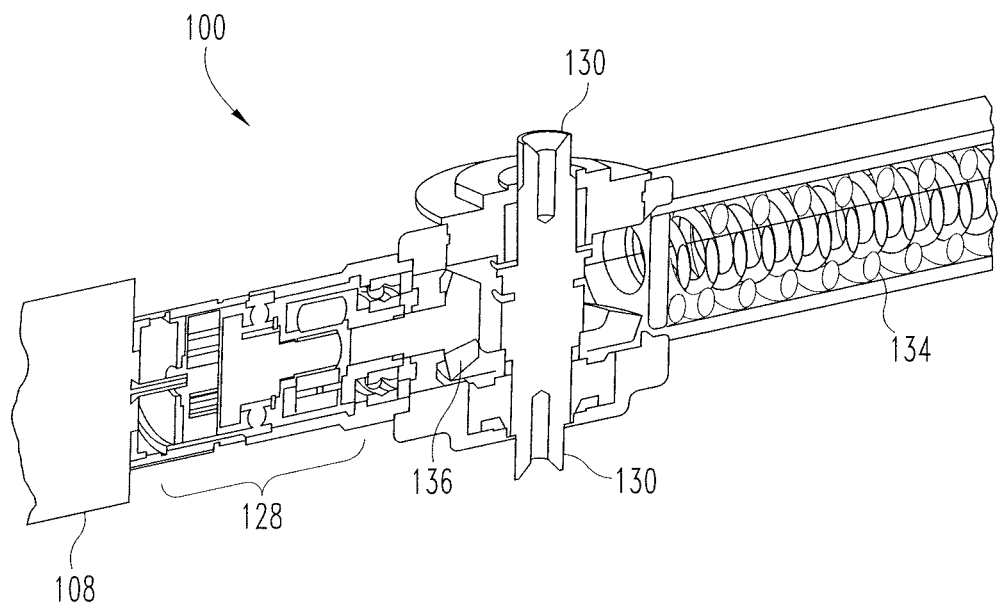
FIG. 3 is an embodiment of a door closer having a planetary gear set.

Referring now to FIG. 3, a sectional view of one embodiment of door closer system 100 is provided that includes motor 108. Door closer system 100 of FIG. 3 also includes gear set 128 which in this embodiment includes a planetary gear set coupled to a rack (not shown in FIG. 3 for clarity) and pinion 130, where the pinion 130 acts as a pivot for a closer arm (not shown,) and spring or spring assembly 134. The rotational axis of the shaft of motor 108 may be in-line with or parallel to the planetary gear set 128, which may then be coupled at its opposite end to the pinion 130 via a bevel gear 136. The rotational axis of the pinion 130 may be orthogonal to the rotational axis of the shaft of motor 108. The pinion 130 is coupled to the rack 132, and the rack 132 is coupled to the spring or spring assembly 134.

As the door is opened by a user, an arm, or a set of arms that are attached to a door frame (not shown), pivots and rotates the pinion 130. The angular displacement of the pinion 130 is converted to linear displacement via the rack 132. As the rack 132 linearly translates, the spring 134 is compressed. Compressing the spring 134 and translation of rack 132 rotates pinion 130, which further rotates planetary gear set 128 and the shaft of motor 108. The impedance of control circuit 116 dampens the opening force and stores mechanical energy in storage device 122 as electrical energy which can be used to operate motor 108 for closing the door.

As the door is closing, the spring 134 expands pushing against the rack and rotates the pinion 130. The rotating pinion 130, in turn, pivots an arm or set of arms attached to a door frame, which closes the door. Also as the pinion 130 turns, the bevel gear 136 turns about an axis substantially orthogonal to the rotational axis of pinion 130. The bevel gear 136 is coupled to the planetary gear set 128, which turns the shaft of electrical motor 108 to generate power through control circuit 116 that is stored as electrical energy in storage device 122. In the final phase of closing, the motor 108 receives the stored electrical power from storage device 122 through control circuit 116 to provide a boost force to assist the spring 134 in closing the door to a closed position. The rotational torque of the motor 108 is transferred back to the arm or set of arms attached to the door frame through the planetary gear set 128, and bevel gear 136 and pinion 130.

Figure 4:
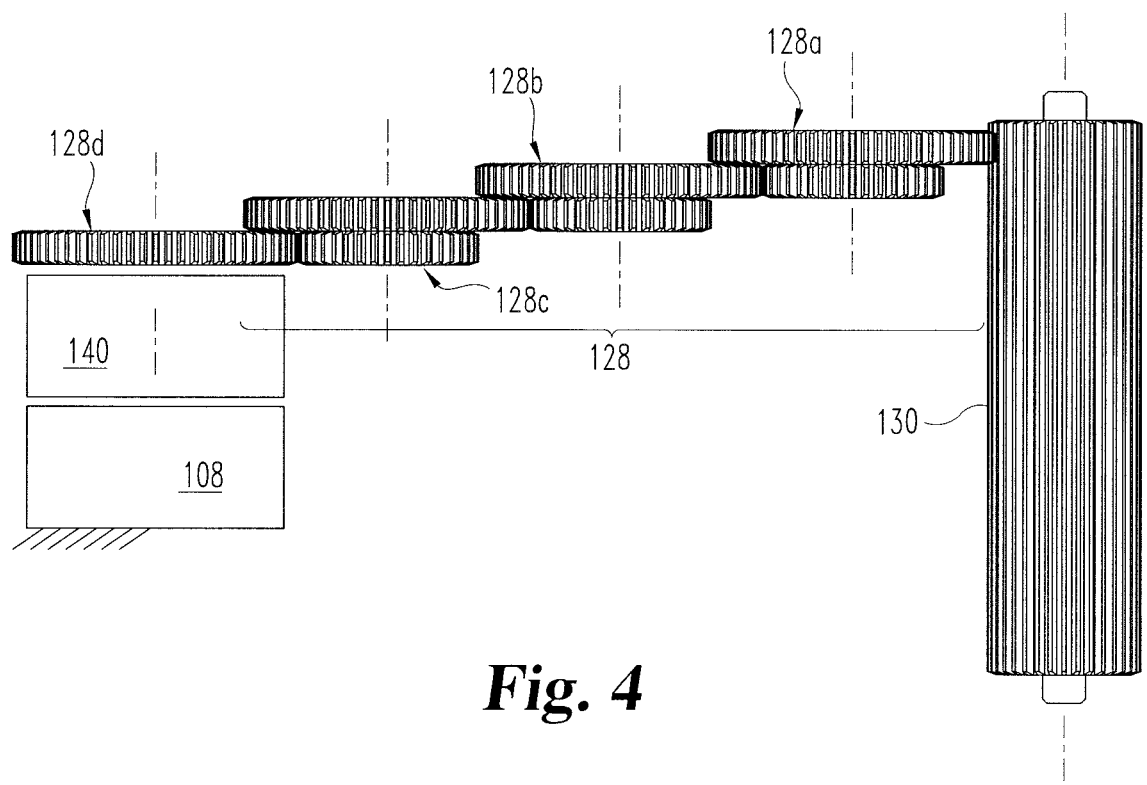
FIG. 4 is an embodiment of a door closer having a spur gear set.

With reference now to FIG. 4, the motor 108 may be mounted within the door closer system 100 such that the rotational axis of a shaft extending from the motor 108 is parallel to the axis of rotation of the pinion 130 and coupled to the pinion 130 through another embodiment of gear set 128 which may include a plurality of spur reduction gears. As shown, four spur reduction gears 128a, 128b, 128c, 128d are provided in the gear set 128 of FIG. 4. However, other configurations with more or fewer gears are contemplated. The gear set 128 with spur reduction gears is intended to increase the rotational speed of the motor 108 while reducing the torque applied to the motor 108.

Referring now to FIGS. 5-8, multiple example embodiments 140 are disclosed for coupling the motor 108 to the gear set 128. As shown, these coupling examples are applied to a spur gear set such as shown in FIG. 4. However, it is further contemplated that the connection arrangements disclosed with reference to FIGS. 5-8 may also be applied with the planetary gear set. The gear set 128 may be used to drive the motor 108 to break or dampen the closing operation of the door. However, the motor 108 and electronics of control circuit 116 can only handle a certain amount of torque before they may become damaged. Accordingly, damage may occur if there is an extreme wind gust, or a user trying to force the door open or closed. Under such conditions, the door may be forced to close faster than the motor 108 and the electronics of control circuit 116 assembly can tolerate.

As shown in FIGS. 5-8, various embodiments of coupling assemblies 140, which may be clutches or clutch means, are disclosed to allow the gear set 128 to disengage from the motor 108 in order to protect the motor 108 while maintaining reliable control of the door. Disengaging the gear set 128 from the motor 108 will introduce some slipping between the motor 108 and, for example, the gears 128a, 128b, 128c, 128d. Therefore, the timing between the gears 128a, 128b, 128c, 128d and motor 108 may need to be realigned at some point after the applied torque is no longer excessive and the motor 108 is no longer in danger of being damaged. As an example, the gear set 128 may slip until the door is closed and then re-engage the gear set 128, such as by using encoders on each gear (the motor gear and the gear set gear) to know the position of each gear from a known starting point.

Figure 5:
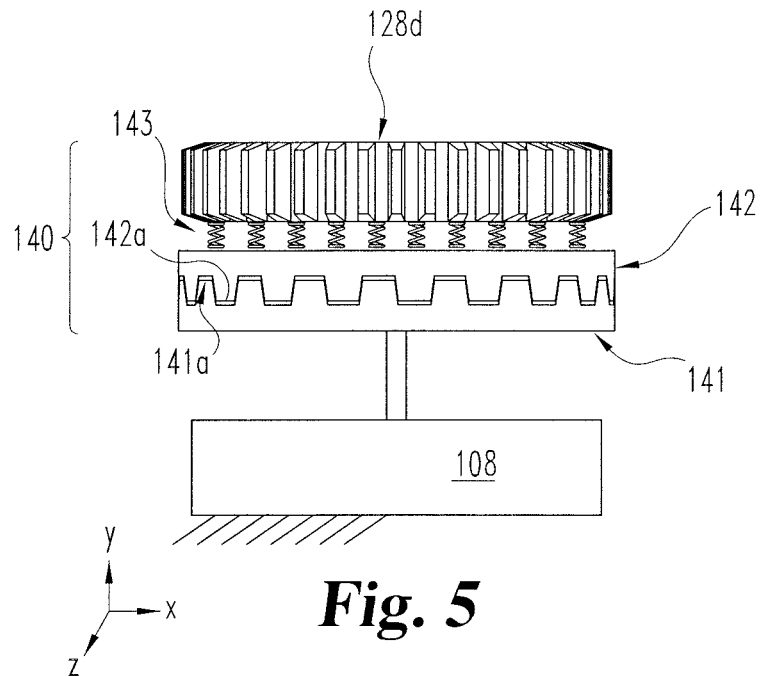
FIGS. 5-8 depict embodiments of various clutch mechanisms to selectively couple a motor to a gear set.

With reference to FIG. 5, an example clutch type coupling mechanism 140 is provided that includes a spring loaded slip disk 142 coupled to gear 128d with compression springs 143 and that further interfaces with and is coupled to a motor coupler 141. Both the slip disk 142 and motor coupler 141 have the same angle-toothed geometry on facing surfaces 142a, 141a, respectively, that provides the interface and therebetween. The compression springs 143 may have enough load resistance capability to prevent the slip disk 142 from moving in the positive y-direction under normal opening and closing loads. Under normal conditions, the slip disk 142, compression springs 143, and gear 128d all rotate as a single unit. Under extreme loading/torques the angled surfaces 142a and 141a of the slip disk 142 and motor coupler 141 generate a strong enough force in the y-direction to overcome the spring force allowing the slip disk 142 to move in the positive y-direction. This causes the slip disk 142 and motor coupler 141 to become disengaged, and allows the gear 128d and motor 108 to rotate at different speeds. After the system returns to normal operation from the overload, the slip disk 142 and motor coupler 141 would become re-engaged by the force of compression springs 143. There may need to be encoders or other means of determining the orientation of the slip disk 142 (which may also be dictated by door position) relative to the orientation of the motor coupler 141, such that when the gears 128 become reengaged the system 100 would know the door position.

Figure 6:
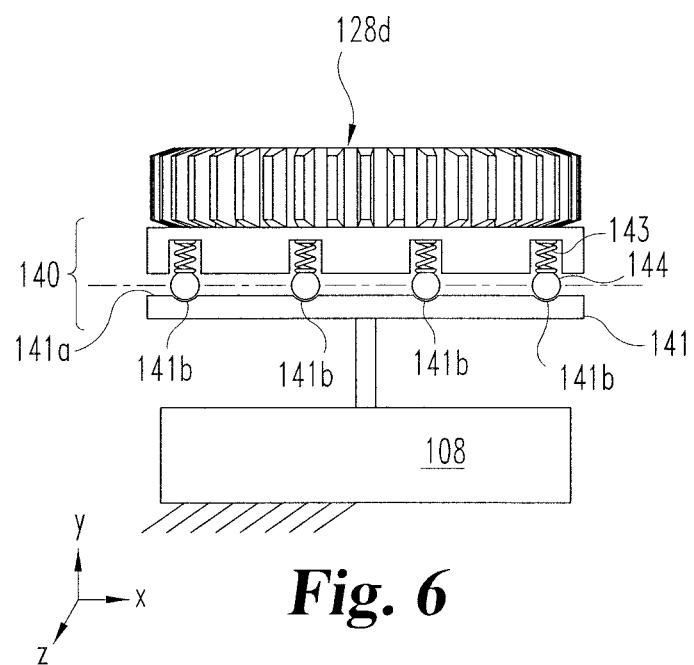

With reference now to FIG. 6, another example of a clutch-type mechanism 140 is provided that includes a set of spring-loaded ball bearings 144 coupled to pockets 141b of the motor coupler 141. The centers of ball bearings 144 sit above the top surface 141a of the motor coupler 141. As the gear 128d is turned, the ball bearings 144 will want to slip past the motor coupler 141 since the bearings are sitting high. However, the spring 143 force keeps the bearings 144 in place and allows the gear 128d and motor coupler 141 to rotate at the same speed. In an overload situation, the y-direction bearing force is strong enough to overcome the spring force and allows the gear 128d and the motor coupler 141 to become disengaged and rotate at different speeds.

Figure 7A:
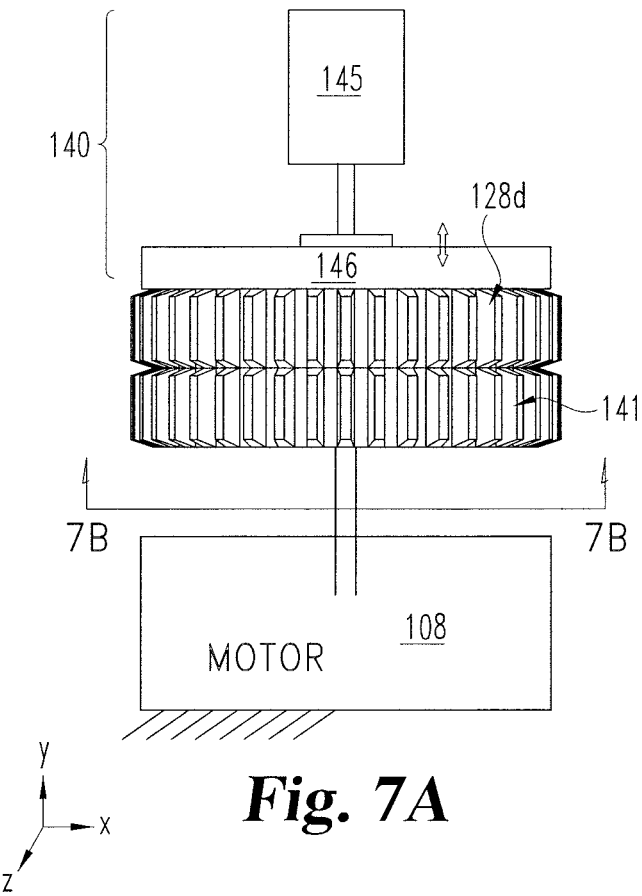
Figure 7B:
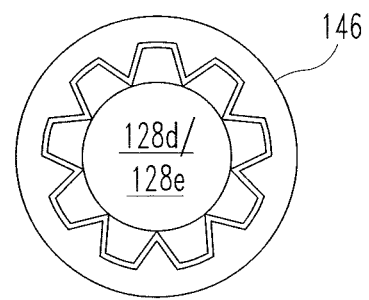

Referring now to FIGS. 7A and 7B, another embodiment of clutch mechanism 140 is provided that includes an electromechanical actuating device 145, such as solenoid, and a gearing coupler 146 that, in one example, is a sleeve that shrouds or envelopes both the gear 128d and motor coupler 141. This embodiment requires that the gear 128d and motor coupler 141 possess identical gear geometry, with the sleeve 146 being capable of engaging the teeth of both the gear 128d and motor coupler 141 simultaneously, such as shown in FIG. 7B. In normal operation, the sleeve 146 would envelope and engage both the gear 128d and the motor coupler 141 simultaneously, allowing all three components 128d, 141, 146 to rotate at the same speed. In the situation of an overload/excessive torque, the system will send a signal to the actuating device 145 to pull the gearing coupler 146 away from the motor coupler 141 causing the gear 128d and motor coupler 141 to become disengaged. As a fail-safe mechanism, the actuating device 145 home position could be for the gear 128d and motor coupler 141 to be engaged, and the actuated position would be with the sleeve 146 only engaging the gear 128d. However, an opposite failsafe arrangement is not precluded.

Figure 8:
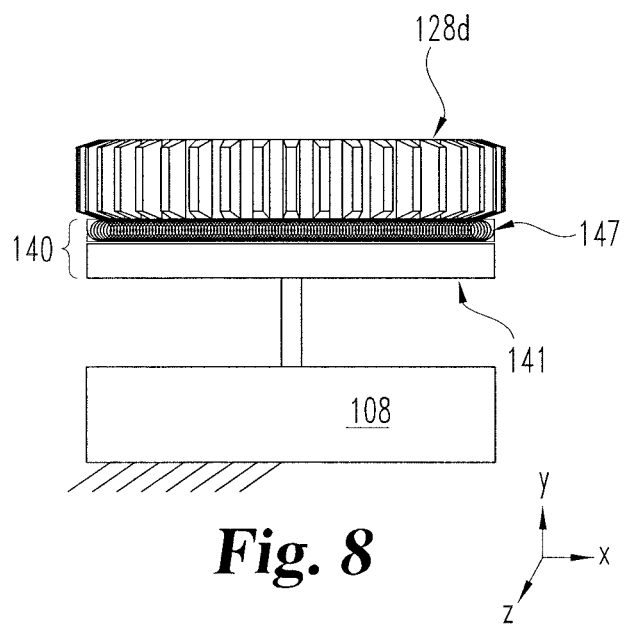

With reference now to FIG. 8, another embodiment of clutch mechanism 140 is provided with a magnetic connector 147 between the gear 128d and the motor coupler 141. The magnetic connector 147 could be created by a magnet or magnetic layer attached to either the gear 128d or the motor coupler 141. The other component would include sufficient ferrous material or composition to be affected by the magnetic field of the magnetic connector 147. The magnetic connector 147 strength and distance between the gear 128d and coupler 141 would be designed such that the magnetic force would be strong enough to keep the gear 128d and the motor coupler 141 engaged under normal torsional loads and allowed to slip in an overload situation.

The clutching mechanisms 140 shown in FIGS. 5-8 are tied to the motor coupled 141 to a spur gear set 128. However, it is appreciated that similar concepts may be applied to a planetary gear set such as shown in FIG. 3 or be applied to the connection between the gear set 128 and pinion 130 instead.

An example system 100 may provide current to control circuit 116 from rotation of a shaft connected to motor 108 in order to induce impedance and allow the motor 108 to dampen the opening and/or closing action of the door. An example system may also be capable of harvesting any available energy to be supplied to the motor 108 in order to provide a boost force to securely close the door or any other energy requirement of the door and/or door closer system 100.

The motor 108 of system 100 may include a variety of forms for generating current for energy harvest as well as provide dampening to the door closer system 100. Any electromechanical device capable of generating a current may be utilized through appropriate control circuitry 1006 to provide a dampening force to the door closer system 100. As such, this would not require a fluid damper as is typically found in door closers. In addition, any electromechanical device capable of providing current may also be utilized to provide means of harvesting energy from the actions of the door closer system 100. These electromechanical devices may include, for example, EDDIE brake systems, Linear motors and actuators, generators and alternators, AC and DC motors—both brushed and brushless, power boost systems that may incorporate batteries and or capacitors that may be interchangeable or chargeable, as well as systems that may add power to the system through other power generation means such as solar power or wind generated power.

One aspect of the present disclosure provides a door closer system having a motor, a spring, a reduction gear set, and a rack and a pinion. The spring is mechanically coupled to the rack. The pinion is coupled to the rack and coupled to the reduction gear set. The motor is mechanically coupled to the reduction gear set. The pinion is rotatable in a first direction about a rotational axis of the pinion to translate the rack and compress the spring and rotation of the pinion in the first direction is impeded by the motor through the reduction gear set. The spring is expandable to act upon the rack and rotate the pinion in a second direction about the rotational axis that is opposite the first direction with rotation of the pinion in the second direction impeded by the motor through the reduction gear set. The motor is configured to generate electricity while impeding rotation of the pinion. The motor is operable with the electricity to rotate the gear set to rotate the pinion in the second direction.

A refinement of the present disclosure provides that the pinion rotation in the first direction is impeded through a control circuit connected to the motor.

Another refinement of the present disclosure provides that the pinion rotation in the second direction is impeded through a control circuit connected to the motor.

Yet another refinement of the present disclosure provides that the spring is expandable to selectively rotate the motor through the rack and pinion and reduction gear set to generate electricity.

Another refinement of the provides that the reduction gear set includes a spur gear set connecting the motor to the pinion.

Another refinement of the provides that the reduction gear set includes a planetary gear set connecting the motor to the pinion.

Yet another refinement of the provides that the pinion is coupled to the planetary gear set with a bevel gear.

Another refinement of the provides that the motor is selectively coupled to the reduction gear set with a clutch mechanism, and the clutch mechanism may be configured to disengage the motor from reduction the gear set if rotation of the motor exceeds a preset rate.

Another aspect of the present disclosure provides a doorway including a door and a door closer system mechanically coupled to the door. The door closer system includes a motor, a control circuit connected to the motor, and a power storage device connected to the motor and the control circuit. The door closer system further including a spring that compresses when the door is opening and expands when the door is closing. The spring is mechanically coupled to the motor through a gear set. The motor rotates in a first direction in response to expanding of the spring to generate electrical energy that is stored in the power storage device. The control circuit is configured to discharge electrical energy from the power storage device to rotate the motor in the first direction to close the door.

A refinement of the present disclosure provides that the motor rotates in a second direction in response to compression of the spring during opening of the door to generate electrical energy that is stored in the power storage device. Another refinement of the present disclosure provides that the motor includes a shaft connected to a gear set, and the gear set is connected to a pinion that is connected to a rack coupled to the spring. Yet another refinement of the present disclosure provides that the motor impedes closing of the door through the control circuit. Another refinement further provides a clutch-type coupling mechanism configured to mechanically decouple the motor from the gear set if the force opening the door exceeds a preset limit.

Yet another refinement further provides a clutch-type coupling mechanism configured to mechanically decouple the motor from the door if a force moving the door exceeds a preset rate.

Yet another aspect of the present disclosure provides: opening a door coupled to a spring, thereby compressing the spring; releasing the door and allowing the spring to expand to initiate closing of the door; generating electricity with a motor operable in response to compression and expansion of the spring during opening and closing the door; storing the electricity in a storage device; and rotating the motor with the electricity to close the door.

Other refinements may include: decoupling the motor from the door if opening or closing the door exceeds a preset rate; rotating the motor rotates a gear set connected to the spring with a rack and pinion mechanism, wherein the gear set is one of a planetary gear set and a spur gear set; and generating the electricity with the motor dampens at least one of a closing rate and an opening rate of the door.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A method, comprising:
compressing a spring in response to opening of a door coupled to said spring;
allowing said spring to expand to initiate closing of said door in response to release of said door;
generating electricity with a motor operable in response to compression and expansion of said spring during opening and closing of said door;
storing said electricity in a storage device; and
rotating a shaft of said motor with said electricity;
wherein the shaft is connected with a pinion such that rotation of the shaft drives the pinion to rotate and such that rotation of the shaft causes rotation of the pinion;
wherein the pinion is connected to said door via an armature such that rotation of the pinion closes said door;
wherein rotation of said shaft in a first rotational direction is correlated with opening of said door; and
wherein rotation of said shaft in a second rotational direction opposite the first rotational direction is correlated with closing of said door.

2. The method of claim 1, further comprising decoupling said motor from said door in response to a movement speed of the door exceeding a preset rate.

3. The method of claim 1, wherein rotating said motor shaft rotates a gear set connected to said spring with a rack and pinion mechanism.

4. The method of claim 3, wherein said gear set is one of a planetary gear set or a spur gear set.

5. The method of claim 1, further comprising dampening at least one of a closing rate or an opening rate of said door via the generating electricity during the opening and closing of said door.

6. The method of claim 1, wherein said door is coupled to a door closer, said door closer comprising a rack engaged between said pinion and said spring, said motor, and said storage device.

7. The method of claim 6, wherein rotation of said pinion in the first rotational direction is correlated with movement of said rack in a first linear direction, compression of said spring, and opening of said door; and
wherein rotation of said pinion in the second rotational direction is correlated with movement of said rack in a second linear direction opposite said first linear direction, expansion of said spring, and closing of said door.

8. The method of claim 1, wherein said generating occurs during opening of said door and during a first closing phase of said door; and
wherein said rotating of said motor occurs during a second closing phase to close said door.

9. The method of claim 8, wherein said door moves from an open position to an intermediate position during said first closing phase; and
wherein said door moves from said intermediate position to a closed position during said second closing phase.

10. A method of operating a door closer, the method comprising:
translating a first door movement of a door to a first pinion rotation of a pinion of the door closer, wherein the door closer further comprises a motor having a motor shaft engaged with the pinion via a reduction gear set such that rotation of the pinion is correlated with rotation of the motor shaft;
translating, by the reduction gear set, the first pinion rotation to a first motor shaft rotation of the motor shaft;
generating, by the motor, a generated electrical power as a result of the first motor shaft rotation, wherein the generating of the generated electrical power impedes the first motor shaft rotation, thereby impeding the first pinion rotation and the first door movement;
storing, in a power storage device coupled with the motor, the generated electrical power, thereby providing stored electrical power stored in the power storage device;
during a second movement of the door that occurs after the first movement of the door, discharging, from the power storage device to the motor, at least a portion of the stored electrical power, thereby providing the motor with discharged electrical power;
generating, by the motor as a result of the motor receiving the discharged electrical power, a torque driving the motor shaft to rotate in a second motor shaft rotation;
translating, by the reduction gear set, the first output rotation to a second pinion rotation of the pinion; and
translating the second pinion rotation to a second door movement of the door, thereby driving the door toward a closed position.

11. The method of claim 10, further comprising:
translating the first pinion rotation to a first rack gear movement of a rack gear engaged with the pinion and thereby compressing or expanding a spring engaged with the rack gear as a result of the first rack gear movement; and
translating the second pinion rotation to a second rack gear movement of the rack gear and thereby compressing or expanding the spring as a result of the second rack gear movement.

12. The method of claim 11, wherein the first door movement is an opening movement of the door in which the door moves away from the closed position;
wherein the first rack gear movement results in compressing the spring; and
wherein the second rack gear movement results in expanding the spring.

13. The method of claim 10, wherein the first door movement is an opening movement of the door in which the door moves away from the closed position;
wherein the first pinion rotation is in a first rotational direction; and
wherein the second pinion rotation is in a second rotational direction opposite the first rotational direction.

14. The method of claim 10, wherein the door closer further comprises a clutch engaged between the motor and the reduction gear set, the clutch having a coupling state in which the clutch engages the motor and the reduction gear set, and the clutch having a decoupling state in which the clutch disengages the motor from the reduction gear set; and
wherein the method further comprises selectively operating the clutch in the decoupling state based upon a movement speed of the door.

15. A method of operating a door closer comprising a pinion, a motor including a motor shaft engaged with the pinion via a reduction gear set, and a power storage device coupled with the motor, the method comprising:
translating an opening movement of a door to a first pinion rotation, thereby causing the reduction gear set to rotate the motor shaft in a first motor shaft rotation, thereby causing the motor to generate a first electrical power, thereby causing the motor to impede the opening movement of the door;

storing the first electrical power in the power storage device;

translating a first closing movement of the door to a second pinion rotation of the pinion, thereby causing the reduction gear set to rotate the motor shaft in a second motor shaft rotation, thereby causing the motor to generate a second electrical power, and thereby causing the motor to impede the first closing movement of the door;

storing the second electrical power in the power storage device; and during a second closing movement of the door occurring after the first closing movement of the door, discharging at least a portion of the electrical power stored in the power storage device to the motor, thereby causing the motor to drive the motor shaft and thereby urging the door toward a closed position;

wherein the first pinion rotation is in a first rotational direction; and wherein the second pinion rotation is in a second rotational direction opposite the first rotational direction.

16. The method of claim 15, wherein the door closer further comprises a rack gear engaged with the pinion and a spring engaged with the rack gear; wherein the first pinion rotation drives the rack gear in a first direction and compresses the spring;

wherein, during the first closing movement, the spring expands, thereby driving the rack gear in a second direction opposite the first direction and urging the pinion in the second rotational direction; and wherein during the second closing movement, the spring expands, thereby driving the rack gear in the second direction and urging the pinion in the second rotational direction.

17. The method of claim 15, further comprising operating a clutch to selectively decouple the motor from the pinion.

18. The method of claim 1, wherein said rotating of said shaft of said motor drives a gear set that rotates a pinion of a door closer to close said door.

19. The method of claim 1, wherein said rotating of said shaft of said motor provides a boost force to completely close the door.

20. The method of claim 1, wherein rotating said shaft of said motor with said electricity to close said door comprises generating, by the motor, a closing force on said door.

* * * * *